US012712487B2

(12) United States Patent
Brunhart

(10) Patent No.: US 12,712,487 B2
(45) Date of Patent: Aug. 18, 2026

(54) PHOTOVOLTAIC ASSEMBLY

(71) Applicant: Walter Brunhart, La Paz (BO)

(72) Inventor: Walter Brunhart, La Paz (BO)

( * ) Notice: Subject to any disclaimer, the term of this patent is extended or adjusted under 35 U.S.C. 154(b) by 0 days.

(21) Appl. No.: 18/661,563

(22) Filed: May 10, 2024

(65) Prior Publication Data

US 2025/0350234 A1 Nov. 13, 2025

(51) Int. Cl.

*H02S 30/20* (2014.01)
*H02S 20/30* (2014.01)
*H02S 30/10* (2014.01)
*H02S 40/30* (2014.01)

(52) U.S. Cl.

CPC .............. *H02S 30/20* (2014.12); *H02S 20/30* (2014.12); *H02S 30/10* (2014.12); *H02S 40/30* (2014.12)

(58) Field of Classification Search

CPC ..................... H02S 20/00–32; H02S 30/00–20
USPC .................................................. 136/243–265
See application file for complete search history.

(56) References Cited

U.S. PATENT DOCUMENTS

2021/0083618 A1 * 3/2021 Lalane .................... H02S 20/10

FOREIGN PATENT DOCUMENTS

| | | | |
|---|---|---|---|
| CN | 217460596 U | * | 9/2022 |
| WO | 2013044404 A1 | | 4/2013 |
| WO | 2014179893 A1 | | 11/2014 |
| WO | 2019144248 A1 | | 8/2019 |

OTHER PUBLICATIONS

CN-217460596-U English (Year: 2022).*

* cited by examiner

*Primary Examiner* — Bach T Dinh
(74) *Attorney, Agent, or Firm* — Morriss O'Bryant Compagni Cannon, PLLC

(57) ABSTRACT

A photovoltaic system has photovoltaic modules which can be arranged in a row and are mounted on a support frame. Adjacent photovoltaic modules with their support frames are connected to one another in an articulated manner by joints or hinges and can be transferred via a drive unit from a substantially extended and flat state into a pushed-together, compact state and vice versa.

The support structure comprises a first pair of guide rails comprised of two guide rails arranged at a distance from one another. Arranged laterally on the photovoltaic modules and on the support frames, respectively, are freely rotatable impellers, the mutual spacing of which corresponds to the spacing of the mutually opposite guide rails, so that the photovoltaic modules with low rolling resistance in the direction of the guide rails can be spread out or moved together.

15 Claims, 8 Drawing Sheets

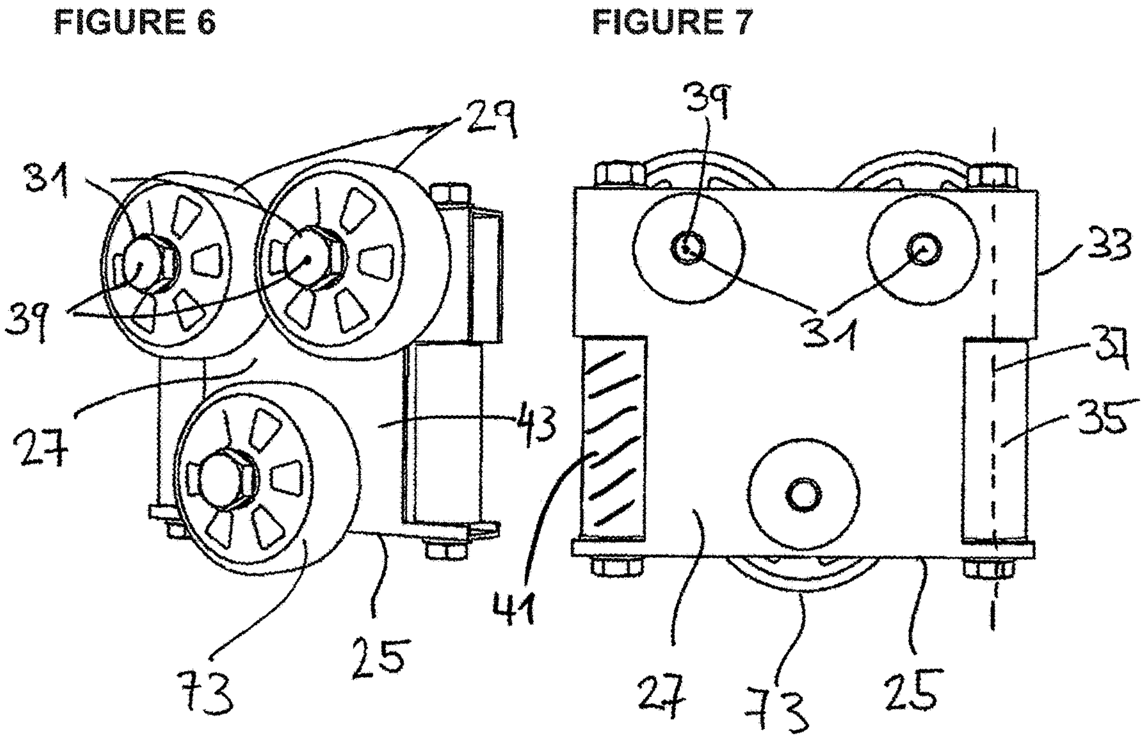
FIGURE 6
FIGURE 7
29
31
39
27
43
73
25
41
39
33
31
37
35
27
73
25
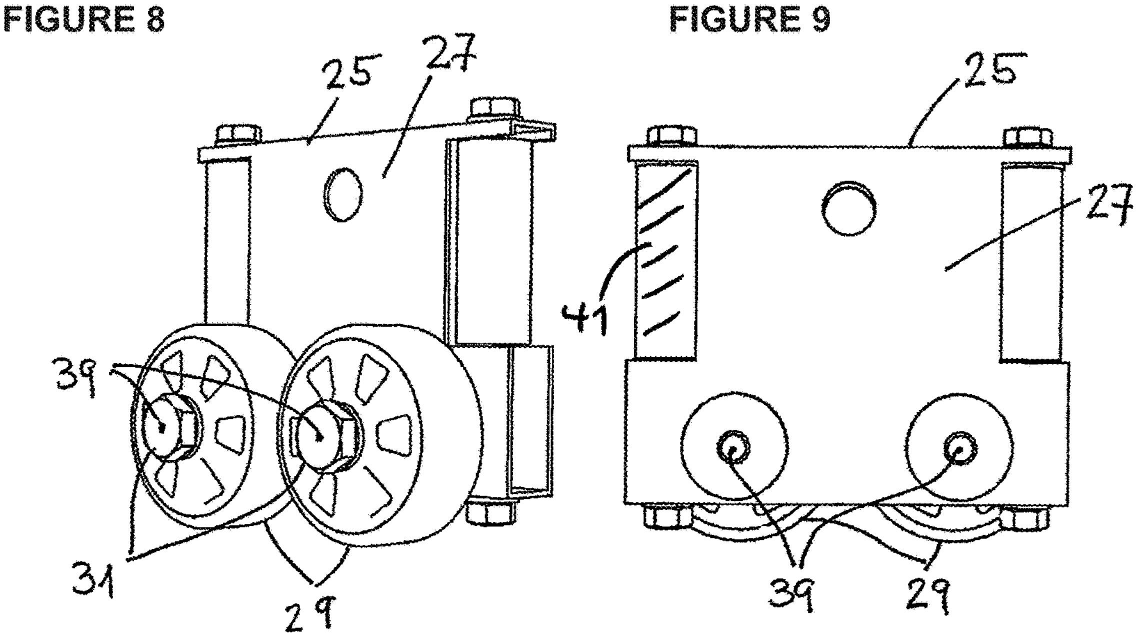
FIGURE 8
FIGURE 9
25
27
39
31
29
25
27
41
39
29

PHOTOVOLTAIC ASSEMBLY

FIELD OF THE INVENTION

This present invention relates to a photovoltaic system.

PRIOR ART

Nowadays, there are a variety of different photovoltaic systems that allow the areas under the system to be used. For example, there are photovoltaic (PV) carport solutions, and solutions have already been implemented in which solar modules are based on tensioned ropes are mounted tightly or rotatable. All these systems require a high use of materials, as the surface of the solar modules is exposed to the natural elements and must therefore be designed for the extreme weather conditions of the respective location. For example, in Central Europe, wind forces in the range of 800-1500 N/m2 can occur, which requires a realization of massive foundations and support systems.

It is even more problematic if the photovoltaic system is going to be installed in tropical countries. Even well-anchored photovoltaic modules would not withstand hurricanes.

The disclosure document WO2013/044404 (A1) shows a system with foldable PV modules that can be folded in unfavorable weather conditions (snowfall, strong wind). In this solution, the modules are foldable suspended between two cables and are extended by a drivetrain in good weather or retracted again in bad weather.

Foldable roofs, which are retracted in adverse weather conditions, have long been used as sun protection and/or rain protection and have already been equipped with photovoltaic elements. Overall, this type of system also requires a relatively large amount of supporting material and anchoring, since the supporting structures must be sufficiently strong to absorb the bracing forces. WO2014/179893 (A1) shows another system with foldable PV modules.

The cited disclosure documents show module carriers that are inseparably connected to one another, both in the extended and in the retracted state. By folding, they can be brought from an extended state into a folded state. The mechanism for unfolding is relatively complex. Module cleaning is difficult to integrate. In addition, they cause relatively high costs for the production of the system and its maintenance.

WO2019144248 discloses an extendable photovoltaic system in which the supports of the solar modules are stacked on top of one another in the retracted state and for the operation can be extended by means of a transfer and a lifting mechanism. Furthermore, the system is equipped with a controller that allows it to retract the photovoltaic modules arranged on the supports under adverse conditions and to stack them one on top of the other.

US 2021/0083618 describes in FIG. 7 an assembly for the construction of a protective device consisting of a container with storage rails and a group of PV panels that can be arranged parallel to each other in a storage position in the container. The PV panels rest on storage rails in the container. A support structure comprises a multiple of parallel support rails and a transfer device with transfer rails, wherein the transfer rails comprise the storage rails to the support rails. The PV panels are movable on the support rails along an assembly direction. During operation, the panels can be transferred from the storage position to an end position in which all panels are supported by the support rails.

In the container, upper and lower storage rails are provided, which are structurally identical both with each other as well as with the support rails and the transfer rails and serve to guide the PV panels. The disadvantage of the kit of US 2021/0083618 according to FIG. 7 is that the PV panels in the container cannot be unwound without interference and become jammed when an attempt is made to pull the PV panels out of the container.

Advantages of the Invention

The goal of the present invention is to provide a photovoltaic system that can be manufactured easily and cost-effectively and ensures trouble-free operation, even in poor weather conditions, and is particularly suitable for mobile use. The photovoltaic system should be stored in a protected location in bad weather conditions and should be extendable in good weather conditions. In addition, the core components of the photovoltaic system (PV modules, inverters, controls) should be able to be quickly protected and transported. Easy cleaning of the PV modules should also be made possible, because in tropical areas the modules can quickly become dirty. Another goal is to provide a low-maintenance system.

SUMMARY OF THE INVENTION

The stated advantages are achieved by the features listed in the independent claims. Advantageous developments of the photovoltaic systems are defined in the dependent claims.

The photovoltaic system according to the invention has a multiple of photovoltaic modules which can be arranged in a row and are mounted on a support frame. Adjacent photovoltaic modules with their supporting frames are connected by means of joints or hinges and can be connected from a substantially elongated and predominantly flat state or slightly inclined to the horizontal into a pushed-together, compact state and vice versa transferable. A drive unit makes it possible to transfer the photovoltaic modules from the compact to the stretched state and vice versa.

The support structure comprises a first pair of guide rails consisting of two guide rails arranged at a distance from one another. Arranged laterally on the photovoltaic modules or on the support frames are guide elements whose mutual spacing from one another corresponds to the spacing of the mutually opposite guide rails.

A turning section and a storage section adjoin the guide rails, the storage section being dimensioned such that the photovoltaic modules can be arranged vertically next to one another and essentially fill it. The turning section is designed to transfer a support frame with the photovoltaic modules arranged thereon from the vertical to a substantially horizontal position and vice versa.

According to the invention, the described photovoltaic system is characterized in that the support frames are arranged in the storage section in a freely suspended manner on the guide rails and the guide elements have freely rotatable impellers and running rollers, so that the photovoltaic modules have only low rolling resistance in the direction of the guide rails or can be moved together. The described system has the advantage that it is very stable, is constructed from simple components and can be unfolded or pushed together without interference, because the support frames with the photovoltaic modules already move in the storage section from the freely hanging storage position, where the support frames with the PV modules are vertically arranged parallel to one another, via free, undefined angles to the forward movement of the supporting frames, and thus adapt to the rolling and running resistances of the respective impellers and, if necessary, running rollers on the upper carriage, compensate for them, move forward and, in a "stop and go" mode, unlock them in an undefined manner to the next front carriage, and allow via the entire length of the enclosure to unwind freely. This is in contrast to the system of US2021/0083618—FIG. 7, where the panels are guided laterally both at the bottom and at the top in the storage position and can therefore only be unwound outside the container. This has the major disadvantage that the panels arranged vertically in the storage position are pushed forward into a certain "zero position" so that they can be processed without interference. Otherwise, they will jam on the upper and lower rails.

According to one embodiment, two adjacent support frames may each be connected to one another via hinges. These can be arranged somewhere between two adjacent photovoltaic modules, whereas the impellers are laterally arranged on the support frames.

Another embodiment provides that two adjacent support frames are each connected to one another in an articulated manner via one or two lateral carriages. This has the advantage that the pivot axis can run between two adjacent modules and pivoting is facilitated.

The carriage advantageously comprises a supporting body and at least one impeller arranged on the supporting body, the axis of rotation of which runs horizontally to and in the plane of the guide rails. The supporting body can be, for example, a rectangular hollow profile.

At least one impeller or several impellers are more convenient designated on the carriage, especially two or three impellers. If two impellers are provided, this has the advantage that the carriage is well supported on the guide rails and an easier, trouble-free extension and retraction of the PV modules is provided.

In addition, for lateral guidance of the photovoltaic modules on the carriage, at least one or two freely rotatable running rollers are provided, the axes of rotation of which run perpendicular to a plane passing through the guide rails. The impellers on the carriage can optionally be replaced by flanged wheels, as in the case of the drive unit, because of which the running rollers can be dispensed with.

In an advantageous embodiment, the axes of rotation of the impellers coincide with the swivel axes of the photovoltaic modules. This has the advantage that the photovoltaic modules can be arranged on the impeller axles and the manufacturing effort is lower.

According to another embodiment, the pivot axes of the photovoltaic modules parallel at a distance from the axis of rotation of the impeller. This has the advantage that the support frames can assume an acute angle to the horizontal in the extended working position.

Expediently, the guide rails are designed as profile-like supports, such as U-profiles, wherein the openings of the U-profiles are oriented towards each other. Such profiles are available on the market at low cost.

The guide rails are advantageously U-shaped profiles, wherein the legs of the U-shaped profiles form first and second tracks for the impellers. This has the advantage that the carriages can be arranged alternately on the first and second running surfaces. During operation, the legs of the U-profile can be connected to the carriages and the end faces of the legs of the U-profiles cooperate with the running rollers or flanged wheels. In contrast to the system of US2021/0083618, the support frames are guided on different levels (running surfaces) of the U-profile and not next to each other. This has the advantage that the support frames with the PV modules do not rest horizontally, but slightly inclined in their extended position. This has the advantage that the PV modules clean themselves when it rains, since the dirty water can drain off.

Contaminated rainwater can spill over the higher frame of the PV protective glass, and impurities are thus removed, while in a horizontal position the water would evaporate and the dirt would accumulate. Another advantage is the gain of space in the width between the guide rails, especially if the width is the same as with a standard transport container. This means that significantly more different standard PV modules can be used in the design and construction of the system, which makes the power in watts per m2 noticeable. Advantageously in the direction of the guide rails, the carriages are arranged alternately on the first and second running surfaces.

Advantageously, the turning section ends before the storage section, and no lower rails are provided to guide the photovoltaic modules in the container. Accordingly, PV modules can freely unfold when pulled apart, and jamming no longer occurs.

The profile of the switch is at least partially open upwards, so that the impeller is exposed. This has the advantage that the impellers have a large range of motion, which effectively prevents the PV modules from jamming when pulled apart.

Advantageously, at least the inlet into the turning section guides the second track away from or toward the first track.

According to an advantageous embodiment, a container, in particular a standard transport container, is provided, which has at least the length of the necessary storage section for the vertical arrangement of the photovoltaic modules. This has the advantage that the entire system can be well protected against storms. The standard transport container can also be transported by truck, ship, or rail.

Advantageously, the design of the carriages is chosen so that when they are moved together, the support frames of the photovoltaic modules in the container are parallel and absorb the thrust forces of the positioning on the carriage in the longitudinal direction to the guide rails and forward them to the drive unit.

Advantageously, the guide rails are mounted on spaced-apart supports. The supports can be provided at such a distance from each other that two or three vehicles are parked next to each other in a gap.

However, it is also conceivable to arrange the guide rails on the ground, in which case the switch must run obliquely upwards from below so that the support frames can be suspended vertically next to one another on the guide rails in the storage position.

Advantageously, the drive unit engages the foremost photovoltaic module. This is a simple and convenient design.

Advantageously, the drive unit has an electric motor, a rechargeable, mains-dependent or mains-independent battery, a transmission and a second type of carriage with drive wheels, wherein the electric motor is connected via the gears that drive the drive wheels. With such a drive unit, the photovoltaic system according to the invention is self-sufficient, so that it can be extended or retracted at any time.

The second type of carriage, in addition to the drive wheels, also has a prestressed pressure roller, which is arranged in such a way that one leg of the U-profile between the running surfaces of the impellers and the pressure roller, and presses the drive wheels against the running surface by means of a spring element. This can prevent the drive wheels from spinning.

Alternatively, a positive connection can also be made between the drive wheels of the drive unit and the guide rail, e.g. via a toothed rack/gear wheel or flanged wheel.

Advantageously, the transmission of the drive unit can also be moved via a hand crank. This has the advantage that in an emergency you do not have to rely on an electric motor and a battery to bring the photovoltaic modules together.

Advantageous as a container uses a standard ISO container with a lockable door on the front side.

BRIEF DESCRIPTION OF THE DRAWINGS

The invention is described below by way of example with reference to the figures. Shown diagrammatically:

FIG. 6: An upper carriage with two impellers and a counter wheel in a perspective view;

FIG. 7: A rear view of the carriage of FIG. 6;

FIG. 8: A lower carriage with two impellers in a perspective view;

FIG. 9: A rear view of the carriage of FIG. 8;

DETAILED DESCRIPTION OF THE INVENTION

Figure 1:
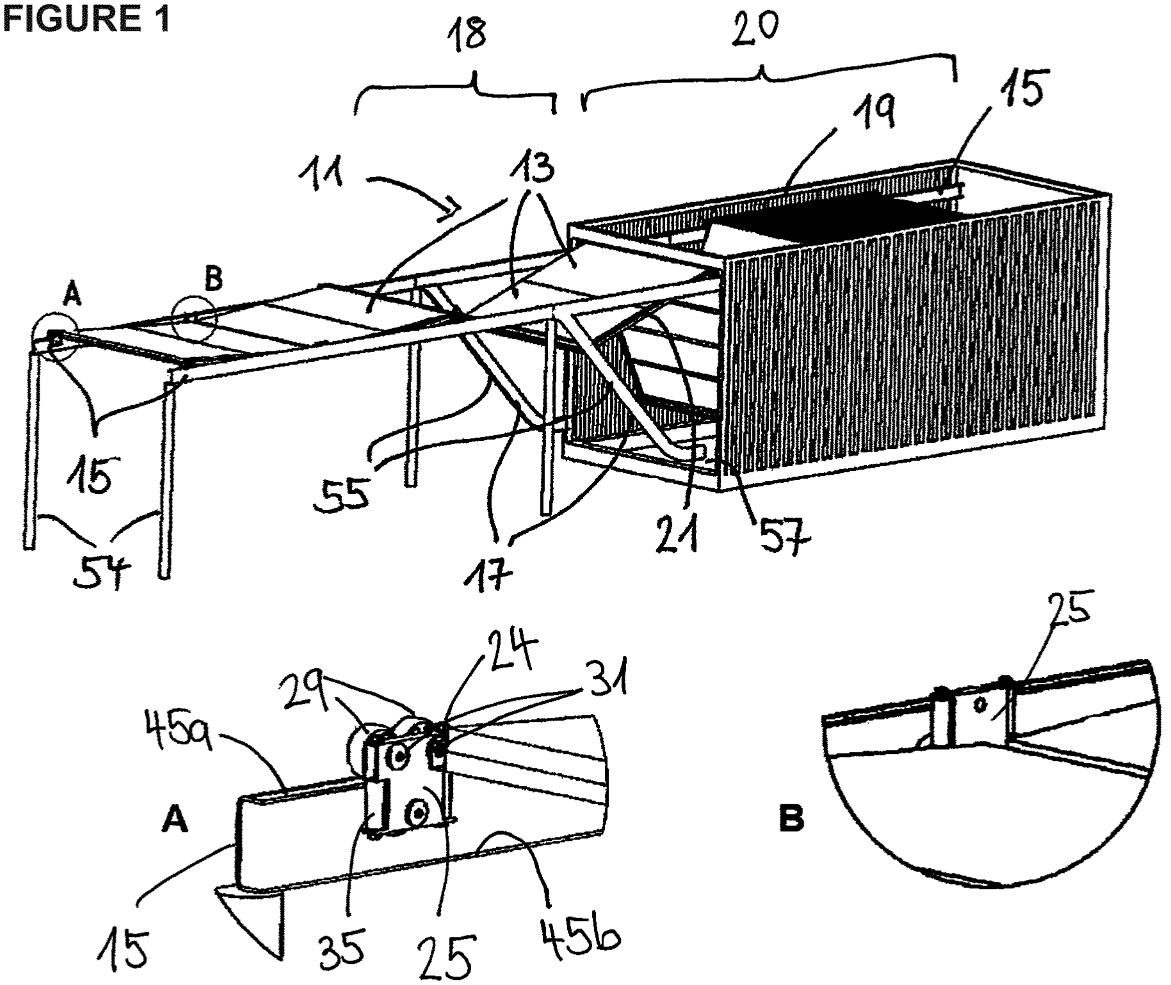
FIG. 1: An embodiment of a photovoltaic system according to the invention with a multiple of photovoltaic modules mounted on support frames, lateral guide rails for extending the modules, and an optional container in which the photovoltaic modules can be arranged vertically and parallel to one another in a space-saving manner, wherein a turning section with a switch is provided in front of the container which serves to pivot the support frames; detail A shows a first carriage which rolls on an upper running surface of the guide rail, detail B shows a carriage which rolls on a lower running surface of the guide rail, and detail C shows the switch of the turning section 18.
Figure 2:
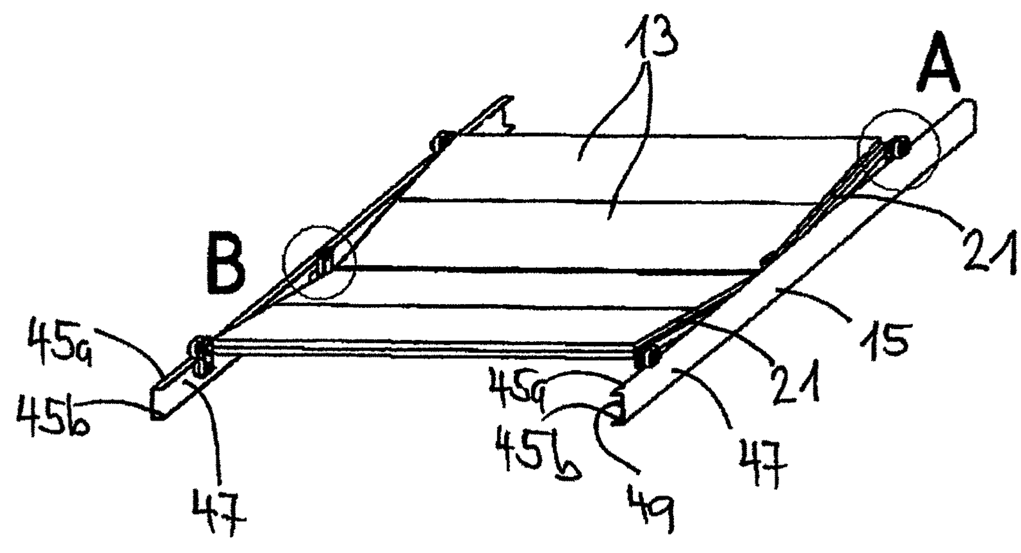
FIG. 2: Two support frames articulated to each other via carriages with the photovoltaic modules arranged thereon.
Figure 2:
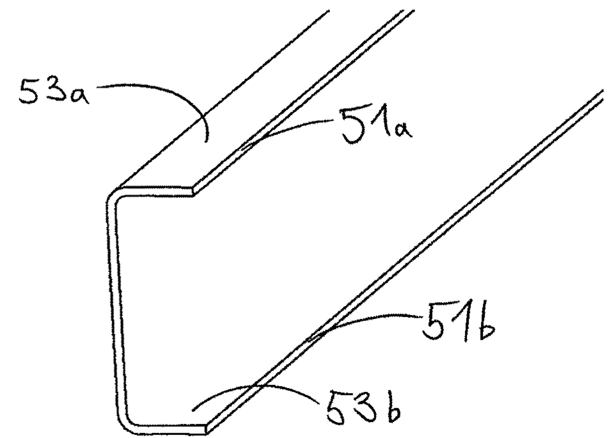
Figure 2:
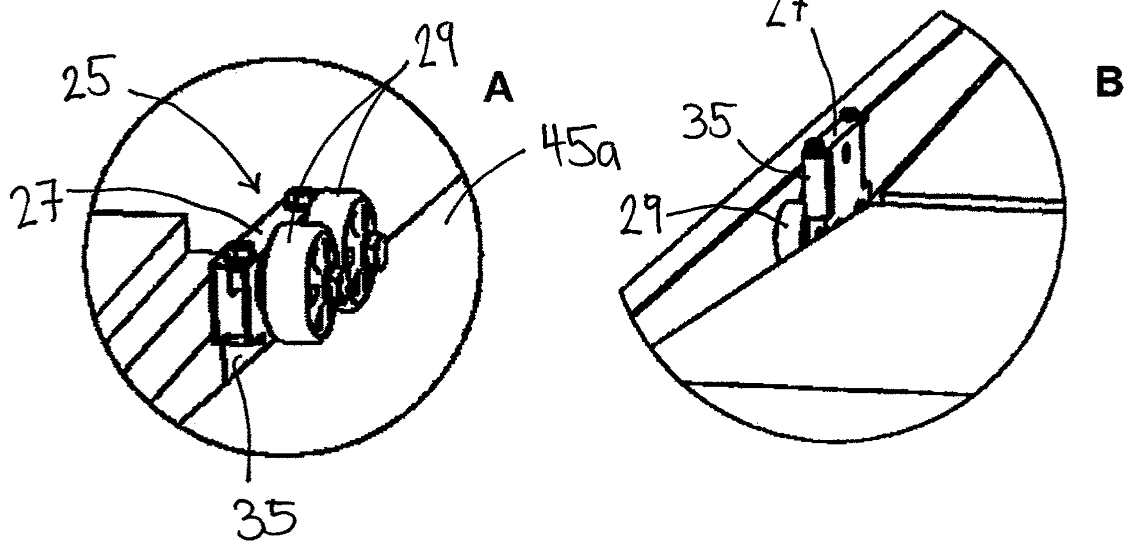
Figure 3:
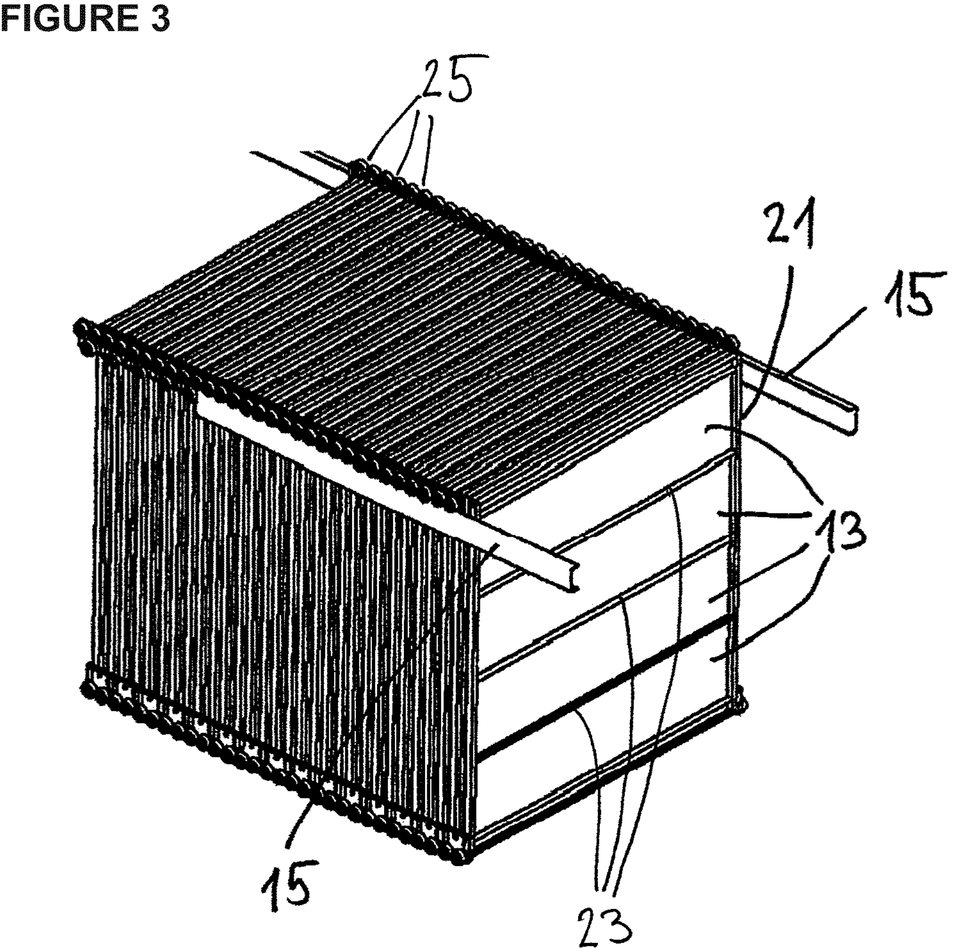
FIG. 3: Support frames with photovoltaic modules suspended from the guide rails.

FIGS. 1 to 13 show a photovoltaic system 11 according to the invention, the essential features of which are: a multiple of articulately connected Photovoltaic modules 13, lateral guide rails 15 on which the photovoltaic modules can be spread, and a switch 17 with which the photovoltaic modules 13 can be transferred from a vertical position to an approximately horizontal position or a position slightly inclined to the horizontal, and vice versa.

When the photovoltaic modules are vertically parallel to each other and at short distances are arranged next to each other, they take up only a small amount of space and, according to another embodiment of the invention, can be accommodated in a container 19 in a space-saving manner. The guide rails 15 therefore extend into the container, while the switch 17 extends only as far as the container 19. In the container 19, the photovoltaic modules 13 are protected against storms, vandalism or theft.

When using an ISO container, the entire photovoltaic system can also be easily transported by truck, rail, or ship. Of course, it is also possible to provide a simple enclosure instead of a container, especially if the system is to be stationary.

The guide rails 15 are adjoined by a turning section 18 and a storage section 20, the latter corresponding approximately to the length thereof in the presence of a container 19. The switch 17 of the turning section 18 has the same profile as the guide rail 15 and extends at an angle of approximately 40 to 50 degrees from bottom to top in the direction of propagation R. It should be noted that the first section of the switch 17 has only one lower track 45*b* (e.g. is designed as an L-profile instead of a U-profile), so that the lower carriages can be placed on the lower track 45*b* from above when unfolding the PV modules, which is not completely controllable depending on the rolling resistance.

Figure 4:
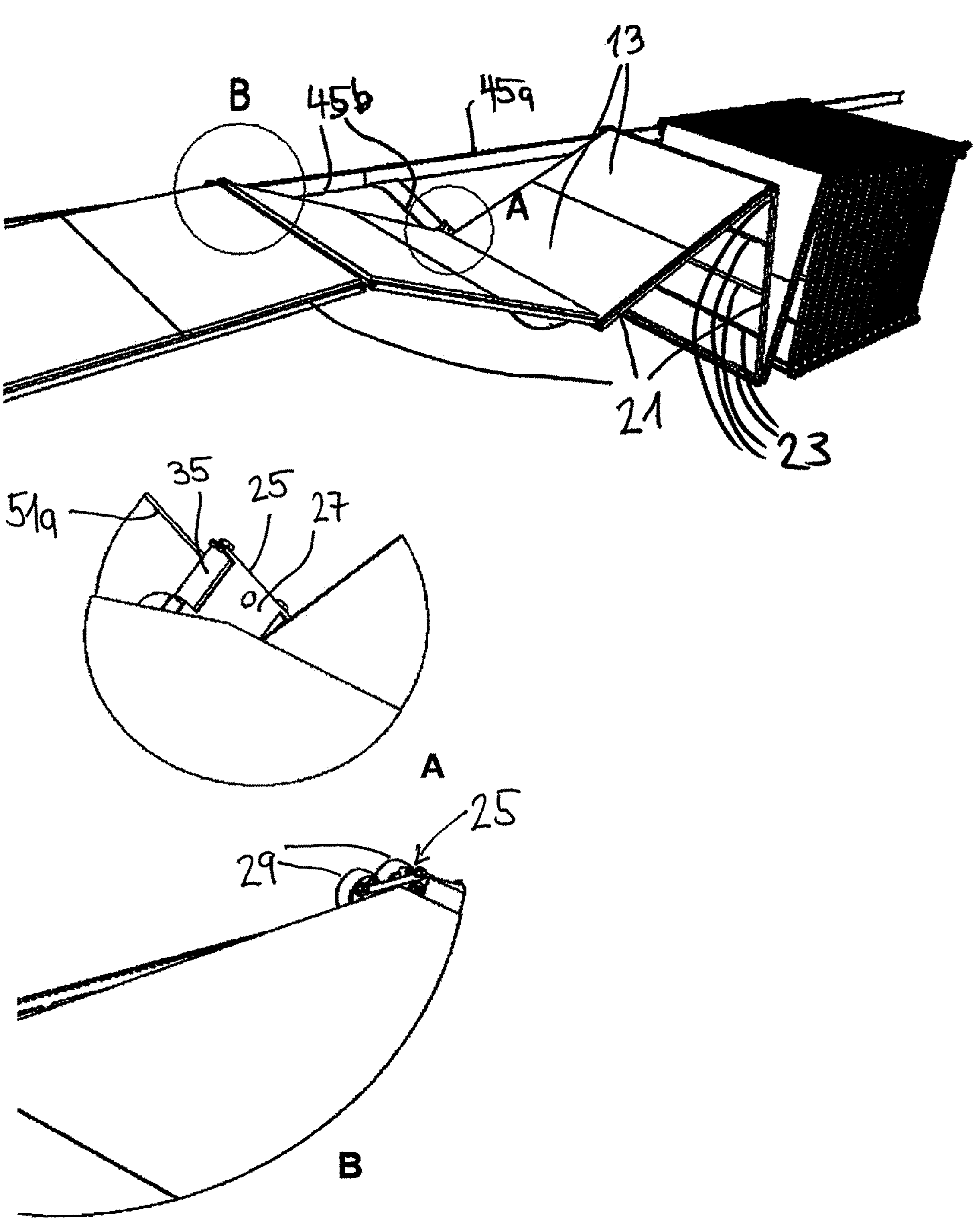
FIG. 4: Schematic of the process of extending the photovoltaic modules from the collapsed storage position to the spread-out working position.
Figure 5:
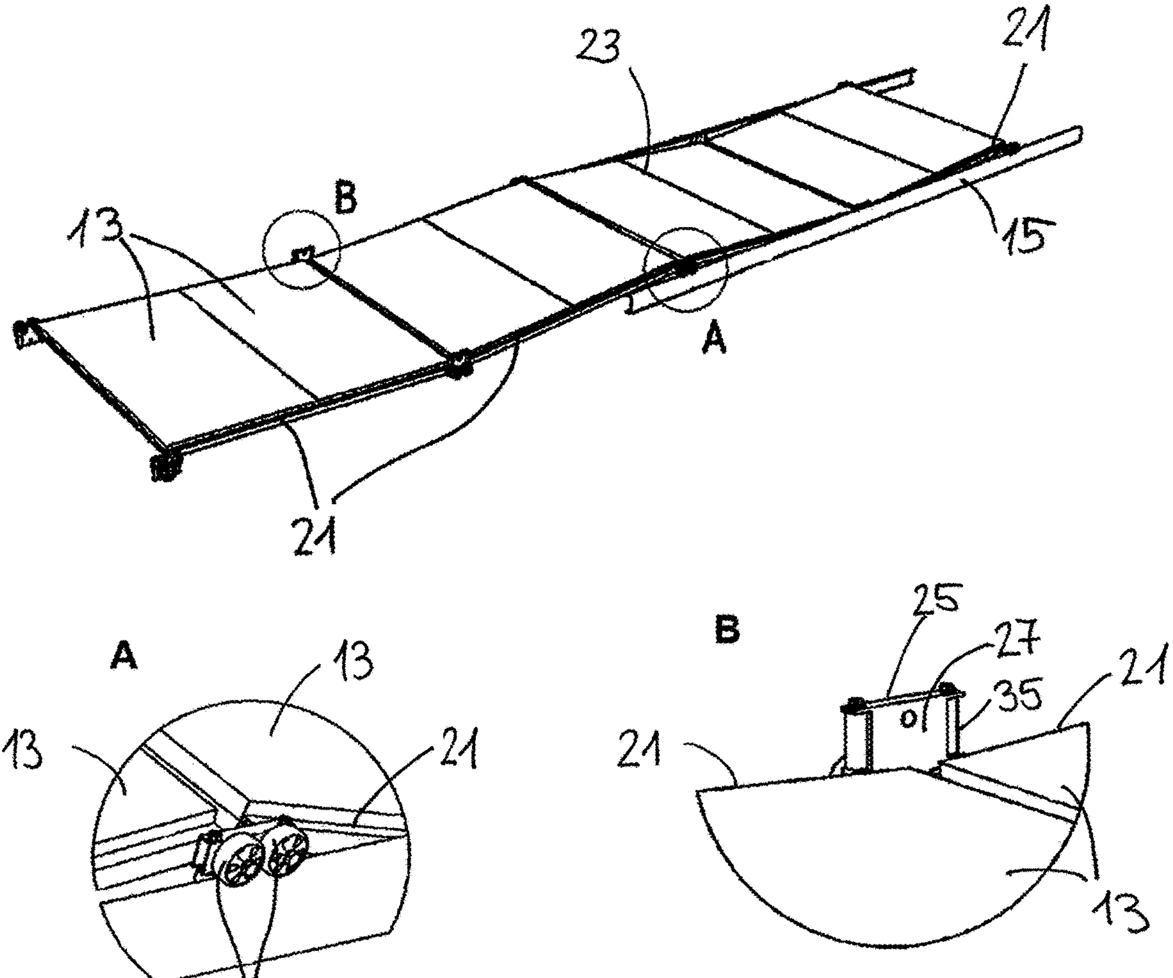
FIG. 5: Multiple support frames in the spread out working position.

The photovoltaic modules 13 are mounted on a rectangular support frame 21. Depending on the expected load on the modules, e.g. with snow or wind loads, the support frame 21 can be designed to be more or less strong and show one or more struts 23 (FIG. 4).

Adjacent photovoltaic modules 13 are connected to one another on a carriage 25 by means of joints 24. A carriage 25 comprises a supporting body 27, on one side of which two impellers 29 are freely rotatably arranged on an axle 31. On the opposite side of the supporting body 27, the photovoltaic modules 13 are hinged. In another embodiment, the photovoltaic modules 13 are also arranged on the axis 31. This means that the pivot axis of the photovoltaic modules 13 can coincide with the axis of rotation 39 of the impellers 29. This is a simple and inexpensive embodiment.

On the mutually opposite narrow end faces 33 of the supporting body are each a running roller 35 rotatably arranged, the axis of rotation 37 of which extends perpendicular to the axis of rotation 39 of the impellers. The running rollers 35 are arranged on the supporting body 27 in such a way that their running surfaces 41 project beyond the flat side 43 of the supporting body 27, on whose side the impellers 27 are arranged.

The guide rails 15 provide two separate and vertically spaced tracks 45*a* and 45*b* arranged one from the other are available for the carriages 25. The guide rails 15 consist of a U-shaped profile 47, wherein the U-shaped profiles with the openings 49 are oriented toward one another. The guide rails 15 are arranged at a distance from one another that corresponds to the distance between the carriages 25 arranged on the support frames 21. This means that supporting frame 21 with the photovoltaic modules arranged thereon can be moved back and forth on the tracks 45*a* and 45*b* with low rolling resistance.

The running rollers 35 arranged on the carriages 25 serve to laterally guide the carriages 25. The running rollers 35 are arranged such that they can interact with the front side 51*a* or 51*b* of a U-profile leg 53*a* or 53*b*.

On the upper and lower tracks 45*a*, 45*b*, the same carriages 25 can be used. The carriages 25 described above have the advantage that they can be used on the upper track 45*a* or the lower track 45*b*. However, the lower carriage 25 is rotated by 180 degrees, so that the running rollers 35 are also connected to the upper front side 51*a* of the upper leg 53*a* in order to interact laterally.

Figure 10:
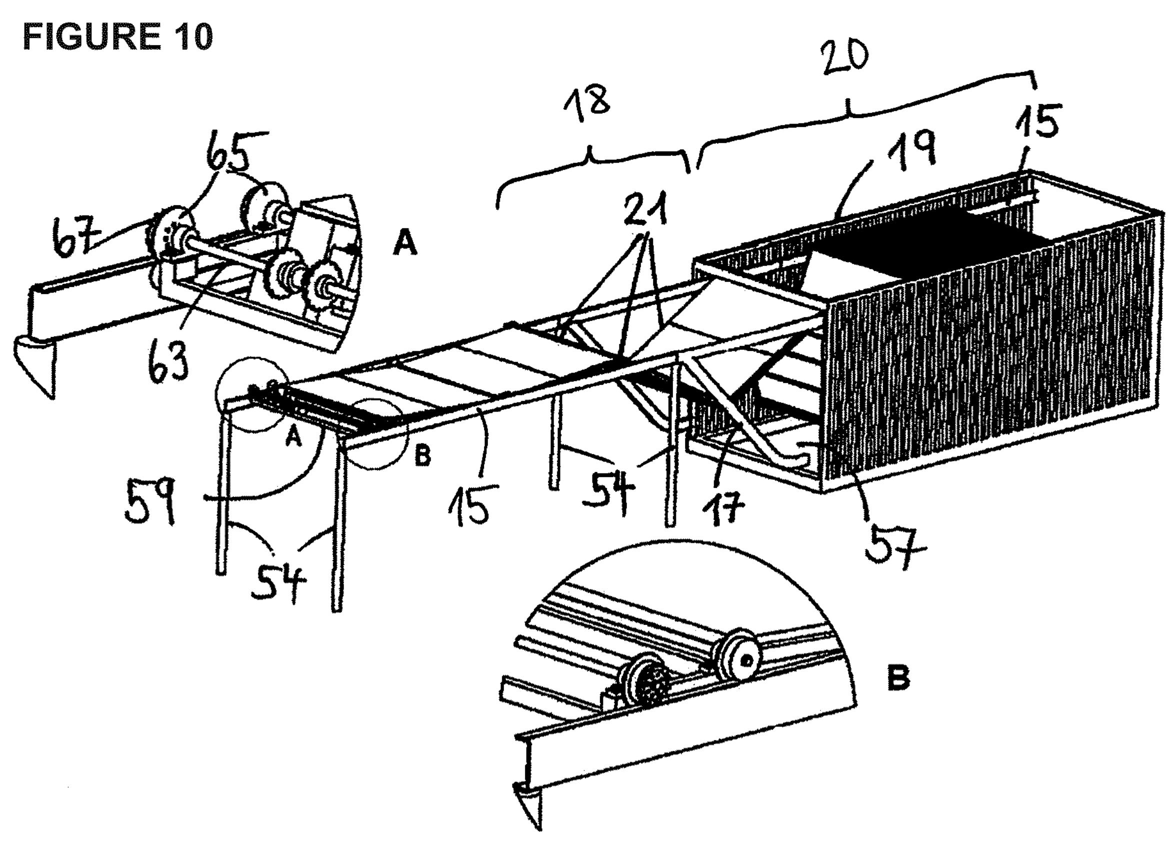
FIG. 10: The process of moving apart the support frames with the photovoltaic modules in a perspective view.

According to the embodiment shown in FIGS. 1, 4 and 10, where the photovoltaic modules 13 are arranged on supports 54 in the extended state, the two tracks 45*a*, 45*b* converge in the guide rails 15 at the switch 17 starting from the container 19. While the one track 45*a* is in the same height, the other track 45*b* leads via a slope 55 from the lower level of the lower carriages to the second track 45*b* of the U-profile In order for the photovoltaic modules 13 to rotate automatically from the approximately horizontal position to a vertical position during displacement, the carriages 25 are alternately mounted either on the upper track 45*a* or the lower track 45*b*. This causes the support frames 21 to rotate automatically in the region of the switch 17 during displacement along the guide rails 19. When the support elements are retracted, the carriages traveling on the upper running surface 45*a* of the C-profile travel in the horizontal direction into the container 19. Meanwhile, the lower carriages on the lower track 45*b* of the C-profile travel over the switch 17 downwards until the support frames 21 with the photovoltaic modules arranged thereon assume a freely hanging vertical position. At the end, the support elements 21 hang on the upper carriages 25, while the lower carriages can hang in the air. Thus, when pushed together, the support frames 21 are independently positioned hanging in the container 19, with the distance of adjacent support frames 21 from each other is defined by the contacting carriages 25.

As can be seen from FIGS. 1, 2, 4, and 5, the carriages 25 moving on the lower track 45*b* are disposed rotated 180 degrees. As in the case of the carriages 25 arranged on the track 45*a*, the upper leg 53*a* of the U-profile serve as a lateral guide. Of course, there are other possible embodiments to realize a linear guide for the support frames 21 that fulfills the desired purpose.

Another possible embodiment of the invention, but not shown in the figures, provides that the guide rails 15 extend on the ground, i.e. on approximately the same level as the container bottom 57 (FIGS. 1 and 10). In this case, the upper track 45*a* in front of the container 19 leads obliquely upwards and extends all the way into the container 19, while the lower track 45*b* may end at the container entrance. This embodiment has the advantage that no complex supports are required, and the system can therefore be made ready for operation very quickly.

A drive unit 59 is provided at the front end of the photovoltaic module arrangement. This drive unit 59 pulls the support frames 21 apart as they unfold. In each case, a single support frame 21 is pulled from the vertical into the horizontal position via the slope 55 of the switch 17. The switch 17 ensures that only little force is required for the deployment of the photovoltaic module arrangement since only a single support element 21 is pivoted in each case and this is supported on the track 45*b*.

Figure 11:
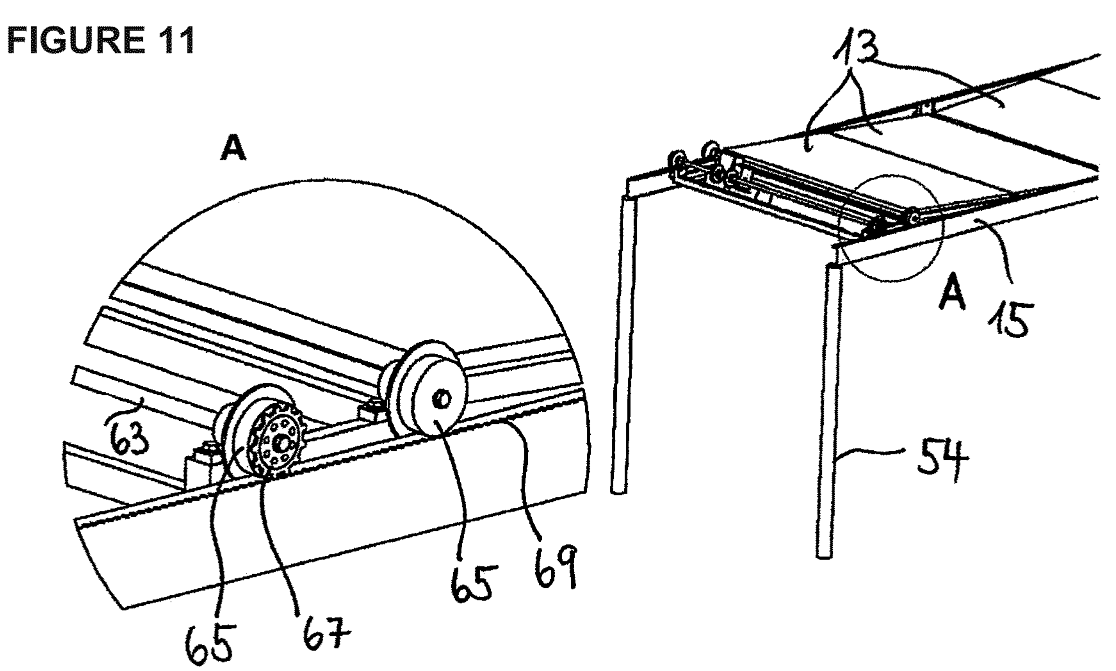
FIG. 11: The end section of the photovoltaic system with a drive unit at the end of the photovoltaic module arrangement.
Figure 12:
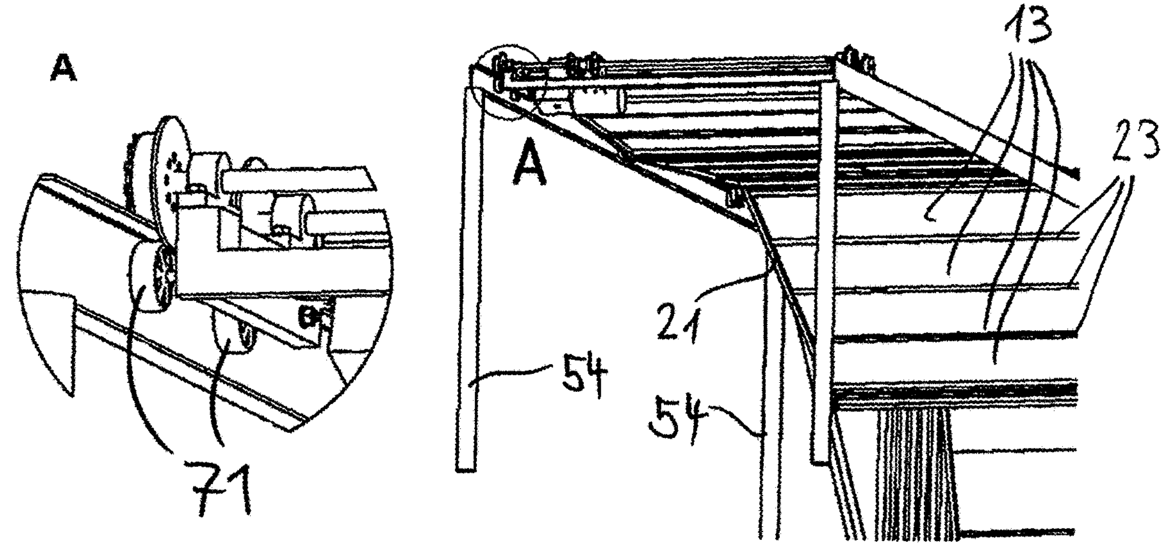
FIG. 12: The end portion of the photovoltaic system from a different perspective.
Figure 13:
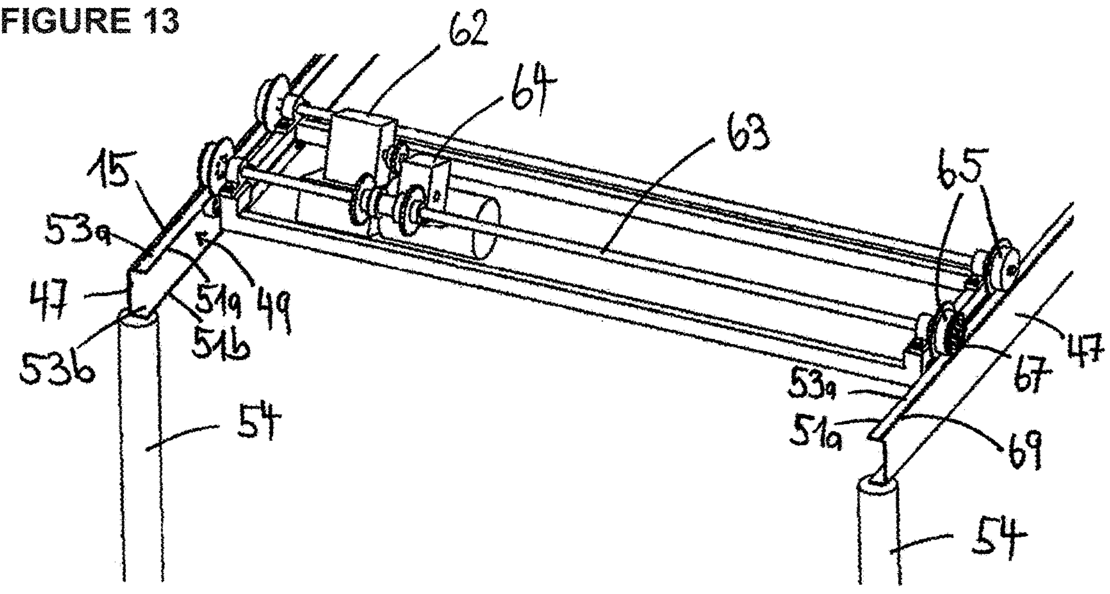
FIG. 13: A perspective top view of the drive unit.

The drive unit 59 comprises a carriage 61 with at least two or four wheels, of which two are drive wheels 65, on which carriage 61 an electric motor 62 with associated rechargeable battery 64 (FIG. 13) for driving a drive shaft 63. A drive wheel 65 is arranged at each of the opposite ends of the drive shaft 63. The two drive wheels 65, like the impellers of the carriages 25, run on the tracks 45*a* of the guide rails 15. In order to prevent the drive wheels 65 from spinning, a gear wheel 67 can be arranged on them, which is connected to guide rails 15 provided toothed rack 69 for better traction (FIG. 11).

Alternatively or additionally, spring-loaded pressure rollers 71 may be provided (FIG. 12), which cooperate with the underside of the track 45*a* and press the drive wheels 65 against the guide rail 15. Such pressure rollers 71 may also be provided for some or all of the upper carriages 25. These prevent the support elements 21 from being able to lift off the guide rails in strong wind.

The rechargeable battery 64 is charged by the solar power obtained, so that the drive unit 59 is always ready for operation and the system is thus is self-sufficient.

According to an advantageous embodiment, the carriages 25 can also have a further impeller 73 at a distance from the two impellers 29 (FIGS. 6 and 7). The additional impeller 73 is arranged at such a distance from the two impellers 29 that the track 45*a* or 45*b* is provided with little play. This can ensure that the support frames 21 with the photovoltaic modules 13 move at strong winds out of the guide rails 15.

The photovoltaic system is used as follows: For transport, the fully functional photovoltaic system is accommodated together with the drive unit in an ISO container, in which the inverters and the control housed at. After the container has been set up in the desired location, supports are set up and the guide rails are mounted on the supports. The switch is then attached to the guide rails, which connects them to the guide rails in the container. Once this has been done, the photovoltaic modules can be extended.

A photovoltaic system according to the invention has a multiple of photovoltaic modules 13 which can be arranged in a row and are mounted on a support frame 21. Adjacent photovoltaic modules 13 with their supporting frames 21 are connected to one another in an articulated manner by means of joints or hinges and are moved from an expanded state into a pushed-together, compact state and vice versa. A drive unit 59 makes it possible to transfer the photovoltaic modules 13 from the compact to the stretched state and vice versa. The support structure comprises a first pair of guide rails consisting of two guide rails 15 arranged at a distance from one another. Arranged laterally on the photovoltaic modules 13 or on the support frames 21 are freely rotatable impellers 29, those correspond to the distance between the mutually opposite guide rails 15, so that the photovoltaic modules 13 can be spread out or moved together with low rolling resistance in the direction of the guide rails 15.

The invention claimed is:

1. A photovoltaic system, comprising:

a plurality of support frames, each having a plurality of photovoltaic modules arranged in a row and mounted thereto, wherein adjacent photovoltaic modules with their respective support frames are configured to be articulated relative to one another by joints and can be moved from an extended state to a retracted state and vice versa, a support structure for supporting the plurality of support frames, and a drive unit configured to move the photovoltaic modules from the extended state to the retracted state and vice versa, wherein the support structure comprises a first pair of guide rails consisting of two guide rails arranged at a distance from one another, and is laterally connected to the photovoltaic modules or guide elements on the support frame, wherein the guide rails are U-shaped profiles, each having an opening, with the openings being oriented toward one another providing two separate and vertically spaced tracks arranged one from the other, wherein mutual spacing from one another corresponds to a spacing of the mutually opposite guide rails, a turning section and a bearing section on the guide rails connecting, the bearing section being dimensioned such that the photovoltaic modules can be arranged vertically next to one another, and the turning section is designed to transfer a support frame with the photovoltaic modules arranged thereon from the vertical to a substantially horizontal or slightly inclined position, and vice versa, characterized in that the support frames of the photovoltaic modules are arranged in a storage section in a freely suspended manner on the guide rails, and the guide elements are freely rotatable impellers having an axis of rotation, which runs horizontally to and in a plane of the guide rails and at least one freely rotatable roller having an axis of rotation, which runs perpendicular to a plane passing through the guide rails for lateral guidance of multiple carriages, so that the photovoltaic modules can be spread out or retracted in the direction of the guide rails with low rolling resistance.

2. The photovoltaic system according to claim 1, wherein two adjacent support frames are each connected via two lateral carriages connected to each other in an articulated manner.

3. The photovoltaic system according to claim 2, wherein the carriage comprises a support body and at least one or more, wheels arranged on the support body, the axis of rotation of which runs parallel to one another through a plane passing through the guide rails.

4. The photovoltaic system according to claim 1, wherein the at least one freely rotatable roller comprises two freely rotatable rollers.

5. The photovoltaic system according to claim 1, wherein pivot axes of the photovoltaic modules are located parallel at a distance from the axis of rotation of the impeller.

6. The photovoltaic system according to claim 1, wherein the guide rails are U-shaped profiles, legs of the U-shaped profiles form first and second tracks for the impellers, wherein in operation the legs of the U-profile interact with the rollers of the carriage.

7. The photovoltaic system according to claim 1, wherein in a direction of the guide rails, the carriages are arranged alternately on the first and second tracks one above the other.

8. The photovoltaic system according to claim 1, wherein a track of the turning section ends before the storage section, and is at least partially exposed in a region of a switch.

9. The photovoltaic system according to claim 6, wherein at least an inlet into the turning section guides the first or second track or away from or towards the other track.

10. The photovoltaic system according to claim 1, further comprising a transport container having at least a length of a necessary storage section for a vertical arrangement of the plurality of photovoltaic modules.

11. The photovoltaic system according to claim 1, wherein the guide rails are mounted on spaced-apart supports.

12. The photovoltaic system according to claim 1, wherein the guide rails are arranged on the ground and a switch runs obliquely upward.

13. The photovoltaic system according to claim 1, wherein the drive unit acts on a foremost photovoltaic module, the foremost photovoltaic module being connected via an electric motor, a rechargeable, mains-dependent or mains-independent battery, a transmission and drive wheels, wherein the electric motor drives the drive wheels via the transmission.

14. The photovoltaic system according to claim 6, wherein the drive unit is arranged such that a leg of the U-shaped profile is received between running surfaces of the impellers and a pressure roller and presses the drive wheels against the running surface by a spring element.

15. The photovoltaic system according to claim 1, wherein a transmission of the drive unit is also configured to be moved via a hand crank.

* * * * *